United States Patent
Ingram et al.

(10) Patent No.: US 10,226,971 B2
(45) Date of Patent: Mar. 12, 2019

(54) APPARATUS FOR DELIVERING AIR THROUGH POWERED AXLE ASSEMBLIES

(71) Applicant: IP Holdings Two, LLC, Guthrie, OK (US)

(72) Inventors: Anthony L. Ingram, Edmond, OK (US); Marvin Lyle Stone, Stillwater, OK (US)

(*) Notice: Subject to any disclaimer, the term of this patent is extended or adjusted under 35 U.S.C. 154(b) by 117 days.

(21) Appl. No.: 15/249,243

(22) Filed: Aug. 26, 2016

(65) Prior Publication Data

US 2018/0056732 A1  Mar. 1, 2018

(51) Int. Cl.
| | | |
|---|---|---|
| *B60C 23/00* | (2006.01) | |
| *B60B 35/14* | (2006.01) | |
| *B60B 27/00* | (2006.01) | |
| *B60B 11/06* | (2006.01) | |
| *B60B 27/02* | (2006.01) | |

(52) U.S. Cl.
CPC ........ *B60C 23/003* (2013.01); *B60B 27/0047* (2013.01); *B60B 35/14* (2013.01); *B60B 11/06* (2013.01); *B60B 27/02* (2013.01)

(58) Field of Classification Search
CPC .......................... B60C 23/001; B60C 23/003
See application file for complete search history.

(56) References Cited

U.S. PATENT DOCUMENTS

| | | | | |
|---|---|---|---|---|
| 7,896,045 B2* | 3/2011 | Solie | ..................... | B60C 23/003 152/416 |
| 9,511,635 B2* | 12/2016 | Berkness | .............. | B60C 23/003 |
| 2015/0047764 A1* | 2/2015 | Tiziani | .................. | B60C 23/003 152/417 |
| 2015/0068654 A1* | 3/2015 | Lewandowski | ....... | B60C 23/003 152/419 |
| 2015/0273958 A1* | 10/2015 | Stoychev | .............. | B60C 23/003 152/415 |
| 2016/0152100 A1* | 6/2016 | Berkness | .............. | B60C 23/003 301/6.5 |

\* cited by examiner

*Primary Examiner* — Jason R Bellinger (57) ABSTRACT

The air transmission structure includes a stator—having an annular outer wall with at least one aperture, an air inlet, and an air passage between the air inlet and the at least one aperture on the annular outer wall—biased against the non-rotating spindle. A housing includes interior annular walls mounted in radially spaced relation with the annular outer wall of the stator to form an annular cavity therebetween, and at least one aperture formed through the interior annular wall, and air outlet, and an air passage between the at least one aperture and air outlet. A seal is inserted within the annular cavity and defines a radial air passage between the apertures defined within the stator annular outer wall and the housing interior annular wall. An annular bearing between the stator and housing is configured to allow the housing to rotate with respect to the stator.

17 Claims, 7 Drawing Sheets

APPARATUS FOR DELIVERING AIR THROUGH POWERED AXLE ASSEMBLIES

BACKGROUND OF THE INVENTION

1. Field of the Invention

The present invention relates to apparatuses for delivering air through powered axle assemblies and to improved powered axle assemblies having such apparatuses incorporated therein.

2. Description of the Prior Art

Automatic central tire inflation systems for vehicle tires are well known and the subject of several U.S. patents, including U.S. Pat. Nos. 3,276,503; 4,387,931; 4,883,106; 5,287,906 and 5,584,949, the disclosures of which are incorporated herein by reference.

Onboard automatic tire inflation systems are currently available for use on trucks and other vehicles. Such systems have been successfully used in non-powered vehicle axle assemblies (i.e., the axle assemblies of trucks or other vehicles which do not include powered drive shafts linked to the vehicle differential or other drive system) to deliver make-up air to a vehicle tire in the event that the tire is punctured or begins to leak or for other reasons, e.g., controlling the tire pressure based on road conditions.

By way of example, an onboard system for maintaining a predetermined pressure in each of the tires of a non-powered truck tandem axle assembly is currently available from Airgo Systems LLC of Edmond, Okla. The Airgo system delivers compressed air from an onboard compressor (e.g., the compressor used for supplying air to the truck brakes) to the interior of the tandem axle, or to a tube extending through the axle, in the event that a leak occurs in any of the four tandem axle tires. The Airgo system also includes: a pair of rotary seals provided proximate the outer ends of the non-powered tandem axle; a set of air lines extending from the rotary seals for delivering air from the interior of the axle, through the rotary seals, to each of the four tires; check valves provided in the air lines for preventing reserve air flow from the tires to the axle; and an indicator light which alerts the operator that a leak has developed. The system controls the make-up air flow in accordance with the operating pressure required by the tires. For most tandem truck axles, the automatic inflation system will typically be operable for providing a sufficient make-up air flow to maintain a tire pressure of at least 90 psig and more preferably at least 95 psig. An onboard automatic inflation system of this type is described, for example, in U.S. Pat. Nos. 6,105,645 and 7,418,892, the entire disclosures of which are incorporated herein by reference.

Although the rotary union assembly employed in the Airgo system allows the use of onboard automatic tire inflation systems in non-powered axle assemblies, the development of a commercially viable system which would allow the use of such onboard automatic tire inflation systems in the powered drive axle assemblies of trucks and other vehicles proved to be more problematic due to the presence of the rotating axle within the spindle. Commercially viable systems for non-powered axle assemblies were not adaptable for use on drive axles and the available drive axle systems usable on other types of vehicles had significant shortcomings and disadvantages. For example, such systems (a) would typically inflate only during a portion of the revolution of the tire or only when the vehicle was stationary, (b) could not operate at highway speeds, (c) did not provide continuous seal lubrication, (d) were not self-contained, and/or (e) required external components which did not fit with the existing axle assembly.

Subsequently, Airgo, in cooperation with Oklahoma State University developed a new rotary union assembly for use in an automatic tire inflation system for powered drive axle assemblies which is the subject of U.S. Pat. No. 7,896,045, the entire disclosure of which also is incorporated herein by reference. While the new rotary union assembly operated as intended, it was comprised of multiple components, increasing its cost of manufacture and making it difficult to assemble and susceptible to leakage. The assembly also introduced air into the rotary union in an axial direction as was typical of the available rotary union assemblies for non-powered axle assemblies. The force of the axially directed incoming air tended to push outwardly on the rotary union and caused the components thereof to tend to separate in the axial direction which could result in the loss of the seal between the rotating and non-rotating components. This issue became more significant in the event of off center wheel mountings due to the resulting wobble of the rotating portions of the assembly with respect to the stationary portions. The combination of wobble and high pressure axial air flow can cause the seal to periodically disengage from its contact surface increasing the possibility of leakage. To reduce the wobble caused by off center mountings, customized spacers were employed for each axle variation, due to the inconsistencies in the distance from the front of the spindle to the back of the axle plate. Development efforts continued and the aforesaid shortcomings with the prior drive axle system have been obviated by the present invention.

Accordingly, the need remains for commercially viable device which will address and overcome these problems and limitations and will allow a flow of make-up air from an onboard tire inflation system to be automatically delivered through a drive axle assembly.

SUMMARY OF THE INVENTION

An air transmission structure is disclosed that transmits air through a drive axle assembly, and particularly along the rotationally stationary spindle to a non-rotating delivery structure, through a transitional seal structure, and thence to a housing that is rotationally locked to the spinning axle hub of the drive axle assembly. The powered axle assembly is of a type that includes a drive axle which extends longitudinally through a non-rotating spindle and is powered for rotation within said non-rotating spindle, a drive axle hub provided at an axial outer end of said drive axle which rotates with said drive axle and is positioned outside of an outer end of said non-rotating spindle, a wheel hub secured to said drive axle hub and extending axially rearward, and at least one bearing which supports said wheel hub on an exterior of said non-rotating spindle for rotation of said wheel hub around said exterior of said non-rotating spindle, said wheel hub having a lubricating oil within an interior of said wheel hub.

The air transmission structure of the present invention includes a stator—having an annular outer wall with at least one aperture, an air inlet, and an air passage between the air inlet and the at least one aperture on the annular outer wall—biased against the non-rotating spindle and having the drive axle extending therethrough. The transmission structure further includes a housing having an interior annular wall mounted in radially spaced relation with the annular outer wall of the stator to form an annular cavity therebetween. The housing has at least one aperture formed through the interior annular wall, and air outlet, and an air passage between the at least one aperture and air outlet. A seal is inserted within the annular cavity and defines a radial air passage between the apertures defined within the stator annular outer wall and the housing interior annular wall. The housing rests on the seal. An annular bearing between the stator and housing is configured to allow the housing to rotate with respect to the stator.

The invention further comprises the seal for use in a drive axle tire inflation system of a type delivering air from a non-rotating body through the seal to a rotating body such as the one above. The seal includes an annular jacket body having an annular groove defined within an inside diameter of the jacket body, an annular groove defined within an outside diameter of the jacket body, and at least one radial air passage in fluid communication between the inside diameter annular groove and outside diameter annular groove. A pair of spaced metal annular reinforcing rings are installed within the jacket body between the inside diameter annular groove and outside diameter annular groove and on either side of the axial air passage. A pair of spaced annular grooves on either side of the outside diameter annular groove are configured to receive an o-ring therein and have a depth such that a top of the received o-ring extends above the outside diameter of the jacket body.

The foregoing and other objects, features and advantages of the invention will become more readily apparent from the following detailed description of a preferred embodiment of the invention that proceeds with reference to the accompanying drawings.

DETAILED DESCRIPTION

Figure 1:
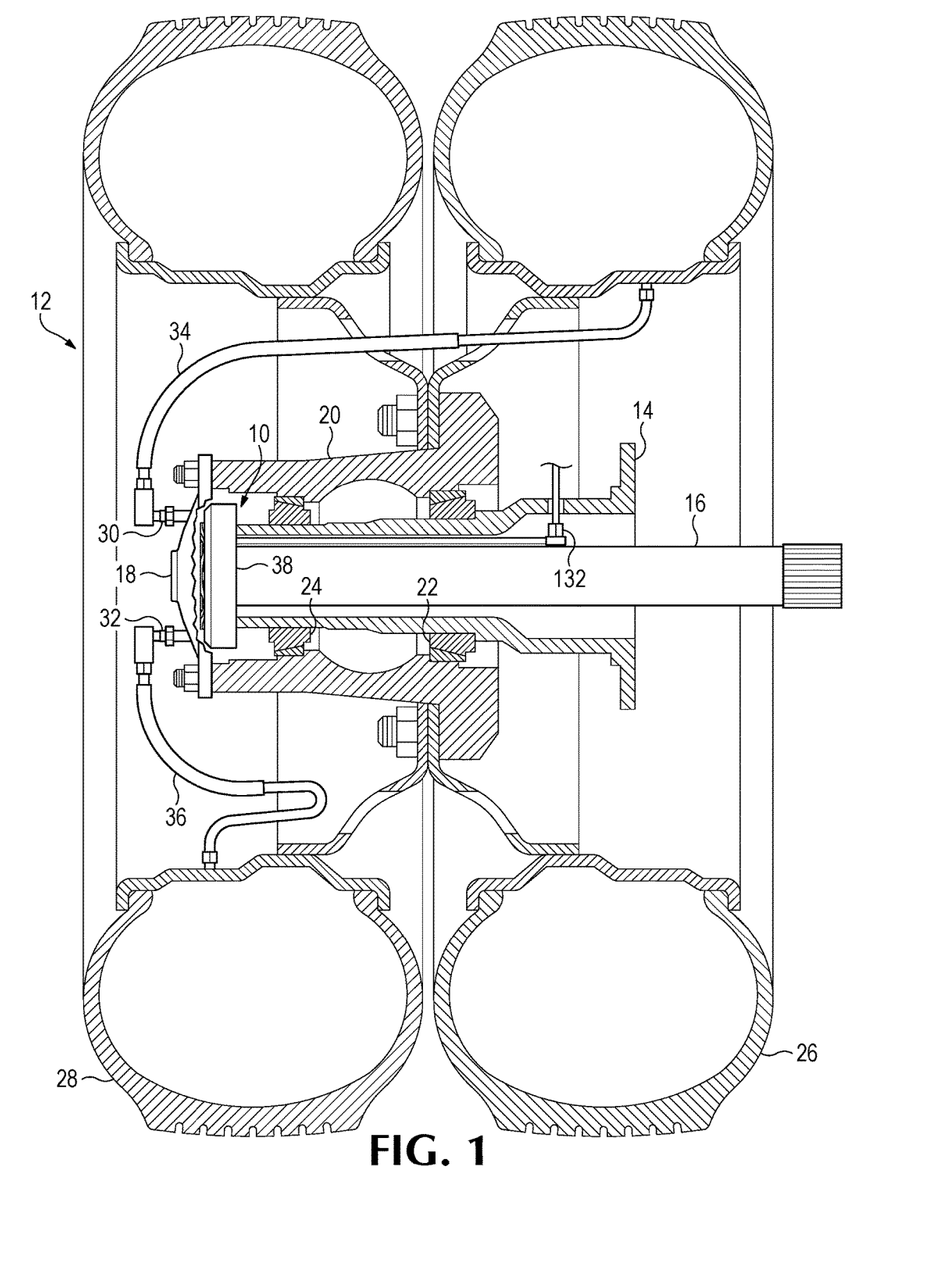
FIG. 1 is a partial sectioned side elevation view of a powered axle assembly incorporating a drive air delivery apparatus configured according to a preferred embodiment of the invention.
Figure 2:
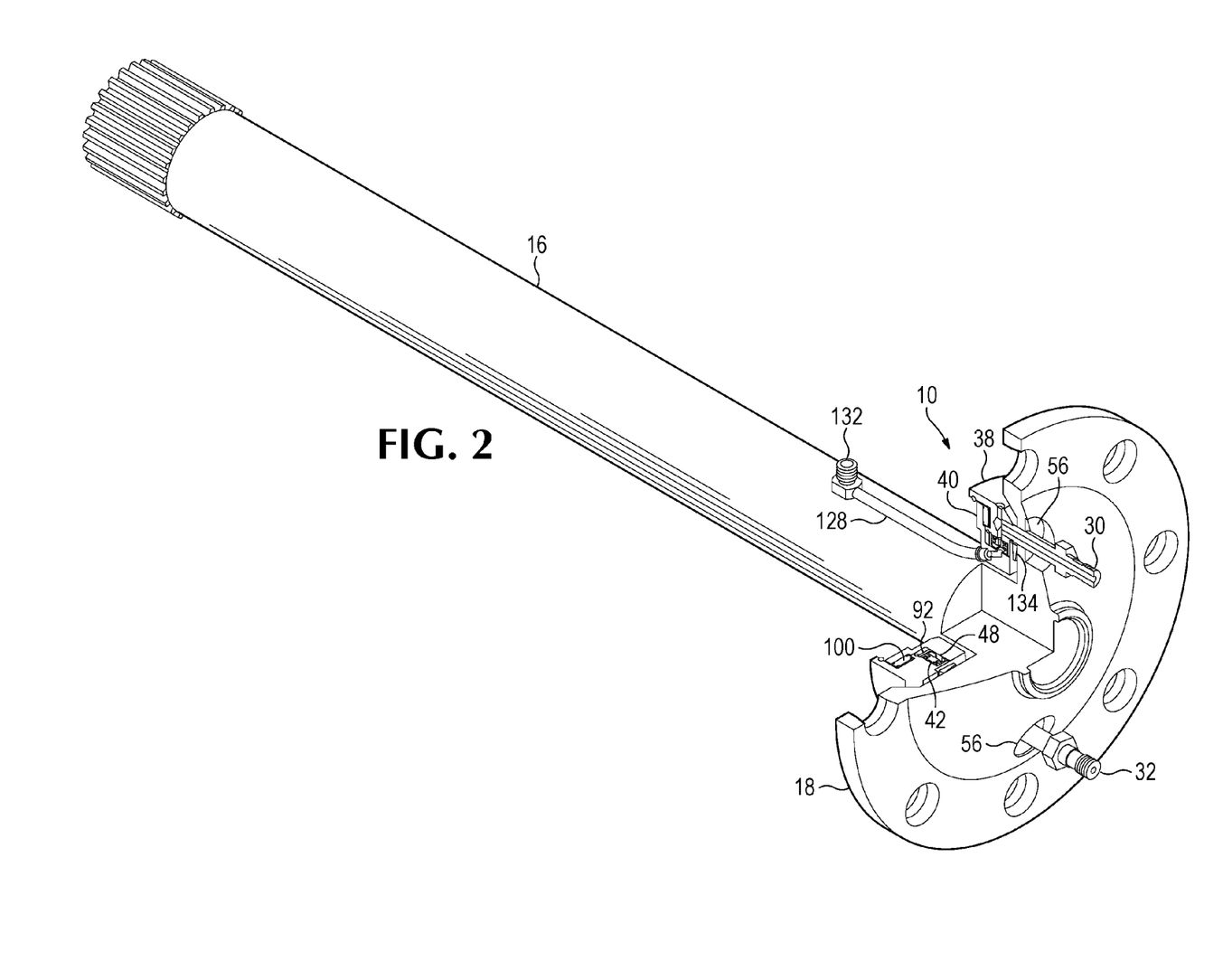
FIG. 2 is a sectioned perspective view of the putter head and alignment bar of FIG. 1.
Figure 3:
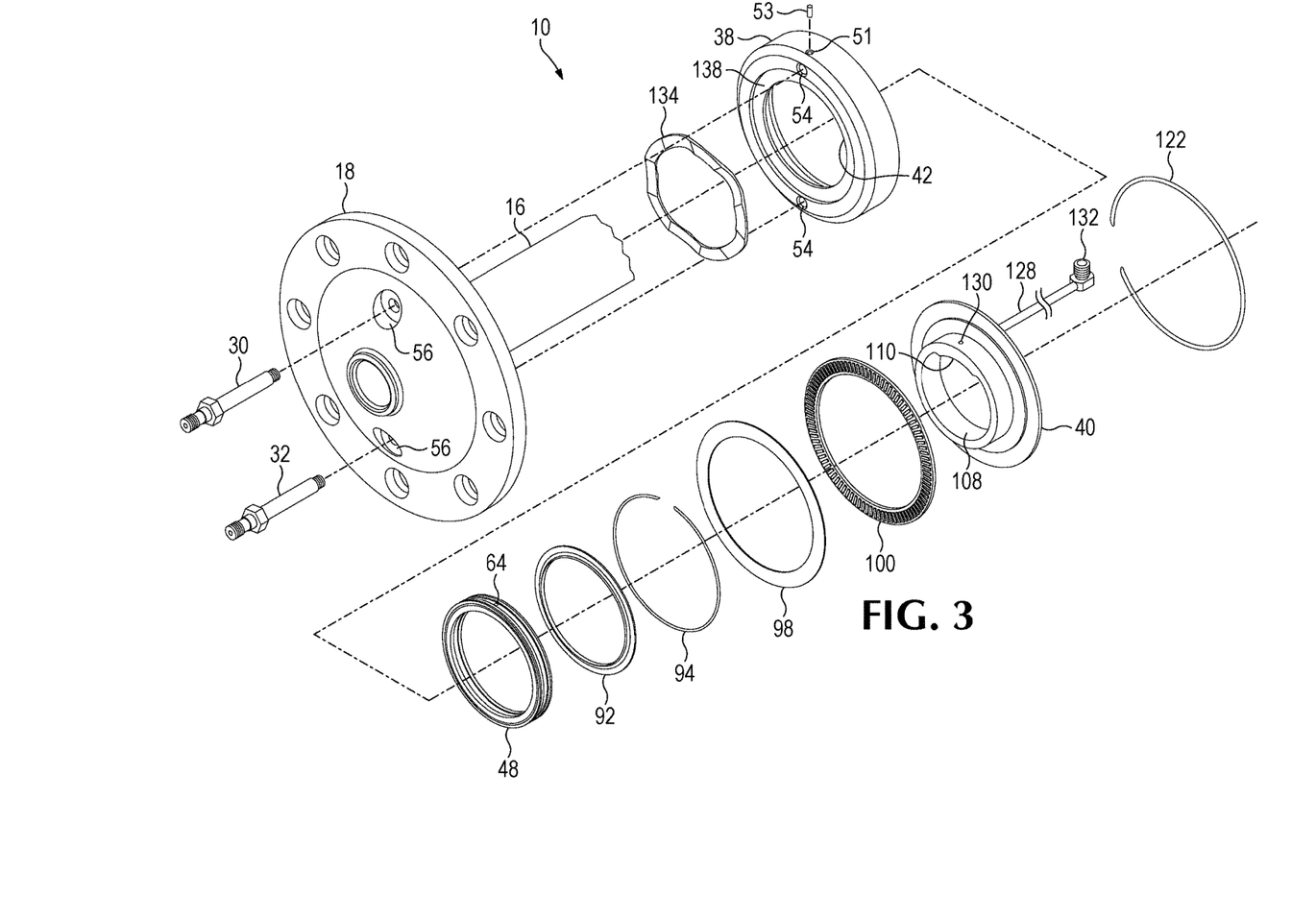
FIG. 3 is an exploded perspective view of the drive air delivery apparatus of FIG. 1.

FIG. 1 illustrates the drive air delivery assembly 10 as constructed according to a preferred embodiment of the present invention as installed within a conventional powered tandem axle assembly 12 used in trucks and other vehicles. As will be understood by those in the art, the powered axle assembly 12 comprises: a non-rotating structure 14 (e.g. a spindle or other housing); a powered drive axle 16 that extends through and rotates with respect to the non-rotating structure 14; a drive axle cap 18 disposed on the outer end of and projects radially outward from the drive axle 16; a wheel hub 20 secured to the drive axle cap 18 for rotation with the powered drive axle 16; and tapered roller bearings 22, 24 that rotatably support the wheel hub 20 on the spindle 14. The powered tandem axle assembly 12 will also include a pair of wheels and tires 26, 28 (or, in some cases, only one wheel and tire per side) which will be mounted on the wheel hub 20.

The inventive air delivery apparatus 10 is effective for allowing air from an onboard automatic tire inflation system or other source to automatically flow through one or more air outlet tubes or other conduits 30, 32 that extend through the drive axle cap 18. Flexible hoses or other conduits 34, 36 can be readily secured to the outer ends of the air outlet tubes 30, 32 for delivering air to the tires 26, 28 of the powered axle assembly 12. As with the systems used heretofore for maintaining inflation in the tires of the non-powered axle assemblies, check valves or other devices can be provided in the air lines 34, 36 extending from the air outlet tubes 30, 32 in order to prevent reverse air flow from the tires 26, 28 to the axle.

Turning also to FIGS. 2-6, the air delivery apparatus 10 for drive systems 12 includes a housing 38 and a stator 40 that fits within the housing.

The housing 38 is shaped with a large diameter axial opening 42 adapted to be spaced around the axle 16, an inner annular groove 44 adjacent the opening 42, and an outer annular groove 46 raised from the inner groove. A seal 48 is press fit within the inner annular groove 46 and surrounds the axial opening 42 of the housing 38. Two or more apertures through the sidewalls 50 of the inner groove 44, e.g. air passage 51, pass underneath the floor 52 of the outer groove 46 and communicate with threaded openings 54 on the back face of the housing. For manufacturing, the air passage 51 can run from the inside diameter sidewall 50 to the outside diameter of housing 38. A plug 53 fills the top part of air passage 51 so that air is communicated instead out openings 54. Brass airline fittings 30 are threaded into the openings 54 and pass through holes 56 formed in the drive axle cap 18. In this way, the housing 38 is rotationally locked with the axle 16 and air may then be directed through respective hose fittings 34 (or conduit 32) and thence to tire 26 (or tire 28).

Figure 4:
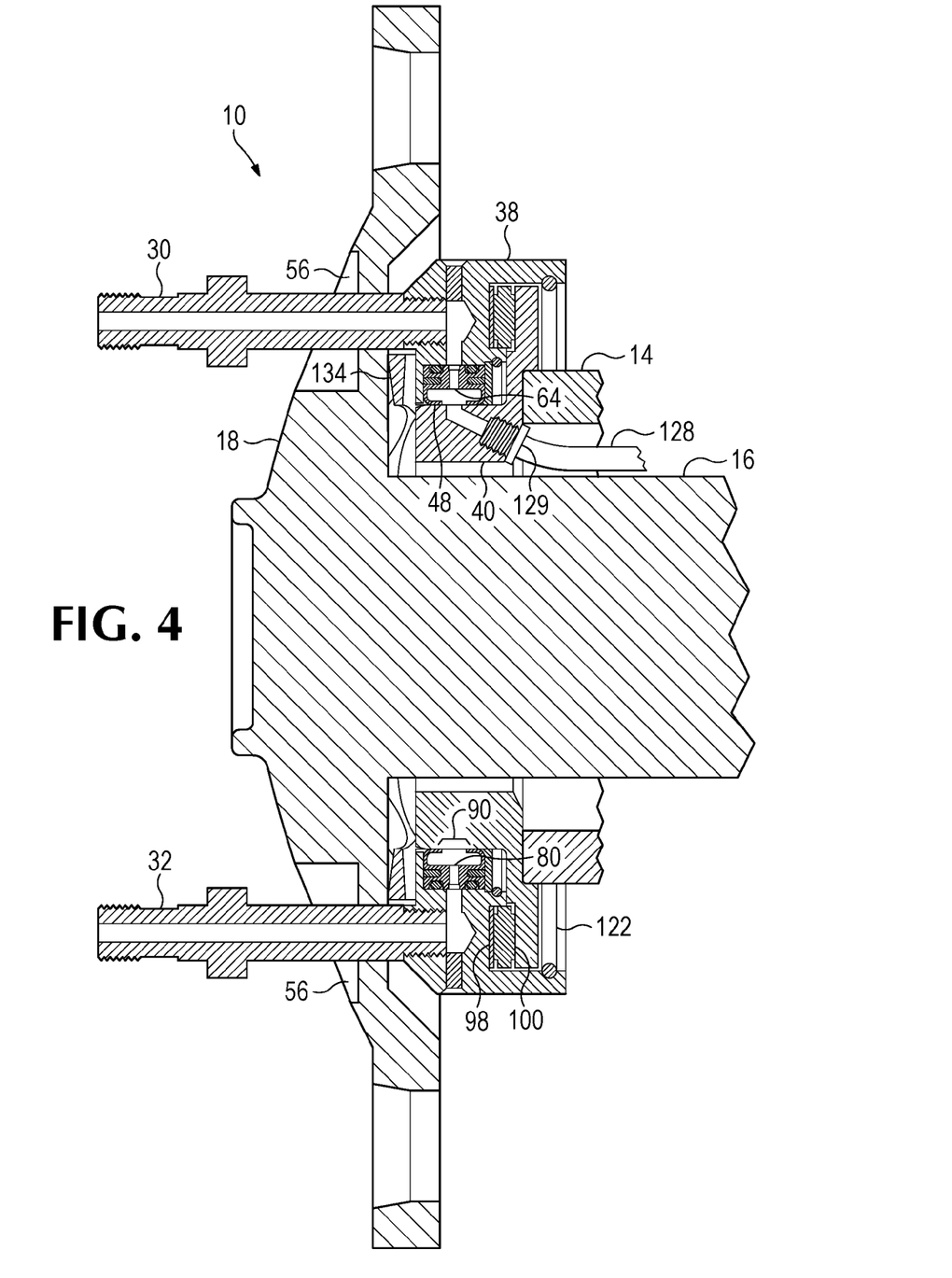
FIG. 4 is a sectioned side elevation view of the assembled drive air delivery system and drive axle hub of FIG. 3.
Figure 5:
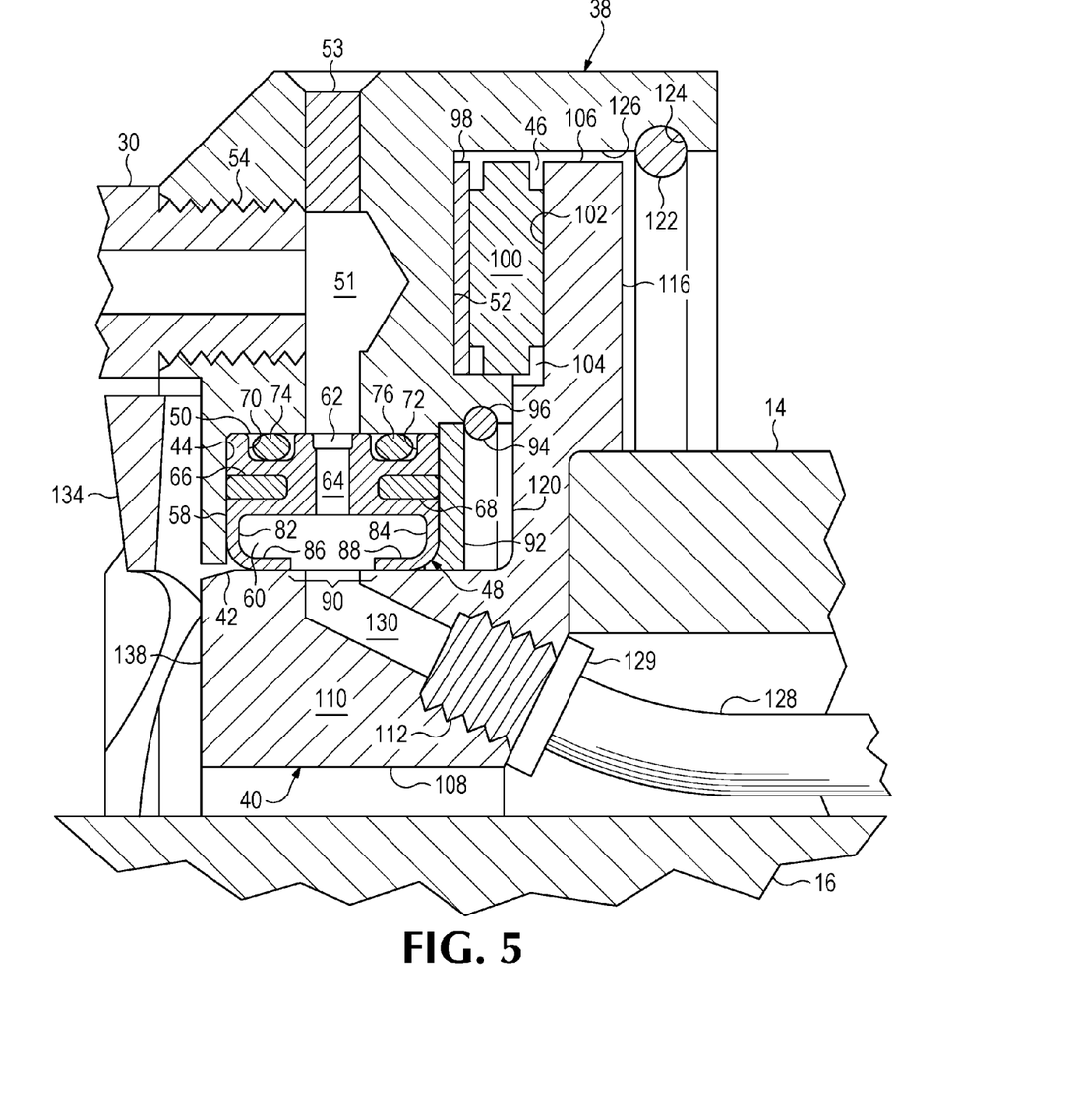
FIG. 5 is a magnified side section elevation view of a portion of the drive air delivery system of FIG. 4 showing the mating of rotating and non-rotating portions.
Figure 6:
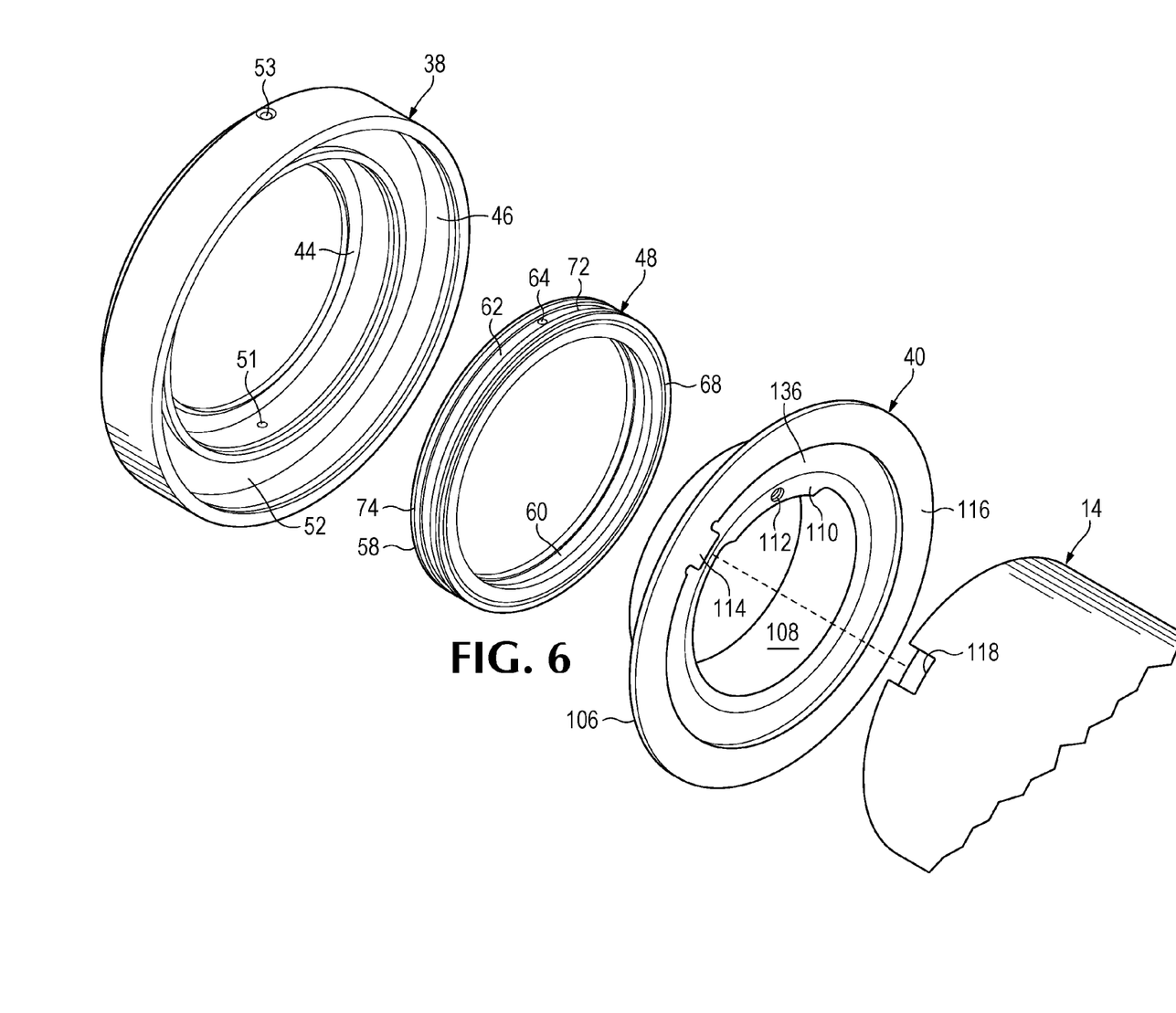
FIG. 6 is an exploded perspective view of a subset of components of those shown in FIG. 3 as viewed from the rear and illustrating how the stator of the drive air delivery apparatus mounts via key and keyway to the stationary spindle.

Turning particularly to FIGS. 5 and 6, the seal 48 includes an annular jacket body 58 having an annular groove 60 defined within an inside diameter of the jacket body 58, an annular groove 62 defined within an outside diameter of the jacket body 58, and at least one radial air passage 64 in fluid communication between the inside diameter annular groove 60 and outside diameter annular groove 62. FIG. 4 illustrates two such radial air passages 64, 80 disposed on opposite sides of the seal 48, e.g. at 180 degrees from one another. The jacket body is formed from PTFE and can include about approximately 15% graphite.

In use, and as discussed further below, the air passage 64 operates to pass air from the non-rotating stator 40 to the rotating housing 38. A pair of spaced metal annular reinforcing rings 66, 68 are installed within the jacket body 58 between the inside diameter annular groove 60 and outside diameter annular groove 62 and on either side of the radial air passage 64. The embedded metal rings 66, 68 act to reinforce the jacket body 58 of the seal 48 and help prevent deformation and are preferably configured with a greater width than height. A pair of spaced annular grooves 70, 72 are formed on either side of the outside diameter annular groove 62 and configured to receive a respective o-rings 74, 76 therein and having a depth such that a top of the received o-ring extends above the outside diameter of the jacket body. The o-rings act to seal the outside diameter annular groove 62 to prevent leakage as air is passed from groove 62 to the housing 38 as discussed further below. A second 80 (or more) axial air passage can penetrate the jacket body 58 between the inner 60 and outer 62 annular grooves and can be spaced about the circumference of the jacket body 58 so that the second radial air passage 80, for instance, can be located one-hundred and eighty degrees from first radial aperture 64 on the annular jacket body 58.

The seal 48 as configured according to a preferred embodiment includes a pair of sidewalls 82, 84 on either side of the inside diameter annular groove 60, with each of the sidewalls 82, 84 coupled to a bottom wall 86, 88 defining the inside diameter of the jacket body 58 and extending inward toward one another to define an annular gap 90 therebetween leading to the inside diameter annular groove 60. Preferably, each of the pair of sidewalls 82, 84 and a respective coupled bottom wall 86, 88 form a unitary resilient wall that curves inward toward one another and having a radius on a lateral face of the resilient wall.

A metal race 92 is fitted over the top of the seal 48 to reinforce a sidewall 84 of the seal and prevent bowing or deformation, and a snap ring 94 placed over that and within an annular groove 96 formed near the top of the inner groove sidewall 50 to lock the seal 48 in place. A bearing race 98 and thrust bearing 100 are inserted within the raised outer annular groove 46 of the housing 38 and allow the housing 38 to rotate with respect to an opposed axial surface 102 on the stator 40 as noted below, the floor 52 of housing 38 and opposed axial surface 102 of stator 40 forming an annular cavity 104 into which the bearing race 98 and thrust bearing 100 are inserted.

Figure 7:
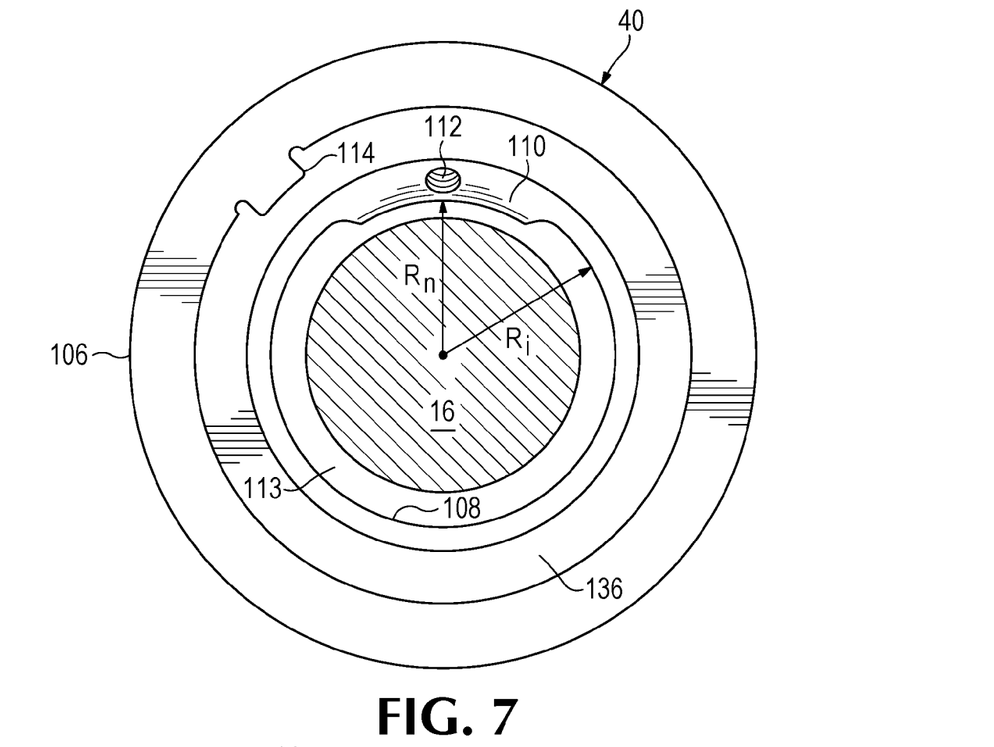
FIG. 7 is a plan view of the stator of FIG. 7 with a drive shaft received therethrough.
Figure 8:
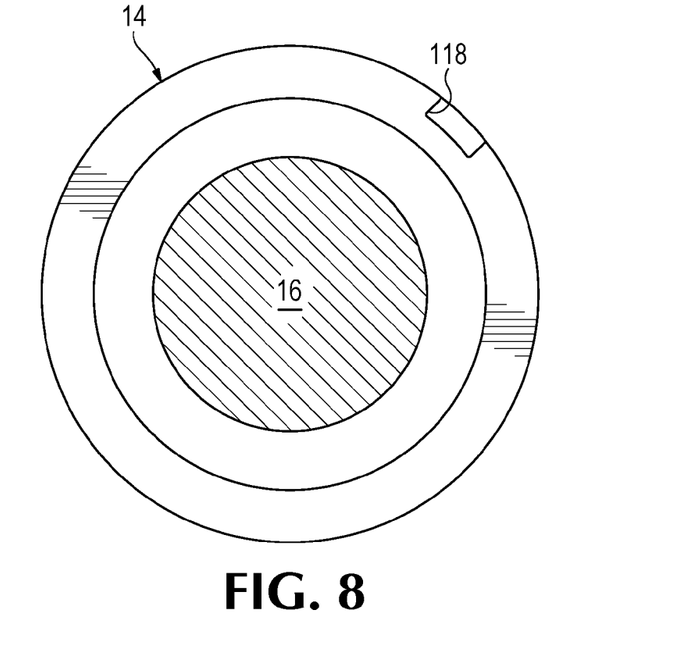
FIG. 8 is a plan view of the spindle with a drive shaft received therethrough.

Turning also to FIGS. 6-8, the stator 40 is an annular body with an outside diameter 106 capable of sandwiching annular seal 48 within the outer groove 46 of the housing 38. An inner diameter (of radius $R_i$), defined by an axial opening 108 through the stator 40, receives the axle 16 therethrough and includes a narrowing chamfered portion 110 defining an even smaller diameter (of radius $R_n$) than axial opening 108 to more snugly fit the axle along a portion 110 adjacent an air inlet 112 formed on the chamfered edge of portion 110. The wider axial opening 108 allows greater space 113 between the stationary stator 40 and the rotating axle 16 so that oil or other lubricants can more easily bathe the outside of the axle 16 and keep it from wearing. This semi-annular notch on stator also allows oil to flow between banjo housing and axle end. The arrangement further keeps oil out of the seal, since the seal can be configured to be self-lubricating and thus not required to be exposed to oil or other lubricant.

Preferably, the stator 40 is formed of a hardened metal for a longer seal life. Methods for hardening include surface hardening using boronizing nitrate, heat treatment, electroplating carbonizing, and/or oil quenching. Preferred hardening processes result in a Rockwell hardness scale measurement of between about 60 and 65, and without a hardening of the metal through and through that may otherwise make the stator too brittle.

A key 114 is formed on the annular back face 116 of the stator 40, away from the housing 38, and is configured with a specified shape and size so as to interface with a standard keyway 118 formed along an outside length of the spindle 14. With the key 114 and keyway 118 engaged, the spindle 14 nests within an annular groove 136 formed on the interior of the outer face 116 of stator 40.

The opposing face 120 of the stator 40 includes an annular ring having a thickness that fits against the snap ring 96, steel race 92, and seal 48 within the housing inner groove 44. Outside of this annular ring is a raised annular surface 102 that forms a race against which the thrust bearing 100 rotates. The stator 40 is inserted within the housing 38 over the seal 48 and race 92, and over the thrust bearing 100 and retained together using a snap ring 122 fit over the backside 116 of the stator 40 and within a groove 124 formed within the upper sidewall 126 of the outer housing groove 46.

Air passes through a PTFE high temperature tubing 128 housed along the length of the spindle 14. A series of expansion rings are retained along the length of the spindle 14 and each include a notch into which the hose is fitted so that it is maintained against an inner wall of the spindle. At some point upstream, the tubing 128 bends upward, e.g. via angle fitting 132, and out the stator via a choke seal that fits within the axle housing.

The airline hose couples via an air connector 129 to a hole 112 formed on the outside face 110 of the stator 40 near the inner diameter. Hole 112 is in fluid communication with an air passage 130 in the stator 40 that angles outward and bends radially up through the stator annular ring adjacent seal 48. When the stator 40 is properly aligned within the housing 38 and against the inside diameter of the seal 48, air from this hole 112 passes into the inner annular groove 60 of the seal 48 and is thence passed through the axial holes 64 to the outer annular groove 62 of the seal. Holes 51 formed up on the sidewall 50 of housing 38 are aligned with the holes 130 of the spindle 40 and with the outer groove 62 of the seal 48. These, in turn, communicate the air at a 90-degree angle to the holes 54 on the front face of the housing 38 coupled to the brass airline fittings 30 that pass through the axle hubcap 18. These lines are then coupled in turn to fittings that pass air into tires mounted on the axle and maintain the pressure therein.

When installed, a wave spring 134 rests within an annular notch 138 on the outside facing surface of housing 38 and around its axial opening 42. When retained within annular notch 138, wave spring 134 is compressed between the housing 38 and the inside of the axle cap 18, which in turn biases the stator 40 against the spindle 14 and maintains the notch 114 on the backside of the stator within the keyway 118. A notch formed on the inside diameter allows oil to pass through the assembly along the axle 16 and also, in an alternate embodiment, bathes the seal in oil to help carry away frictional heat formed due to the seal rubbing against the annular ring of the stator. The seal is formed of a wear resistant material such as graphite.

In combination, the wave spring 134 and notch 114 and keyway 118 combine to accommodate tolerances and allow the stator 40 to "float" around the drive axle 16 as the axle spins relative to the spindle 14 in case the axle is slightly out of round. This minimizes wear on the seals due to run out. The use of the thrust bearing 100 further facilitates rotational movement of the housing 38 relative to the stator 40.

Having described and illustrated the principles of the invention in a preferred embodiment thereof, it should be apparent that the invention can be modified in arrangement and detail without departing from such principles. Accordingly, all modifications and variation coming within the spirit and scope of the following claims are claimed herein.

What is claimed is:

1. In a powered axle assembly including a drive axle which extends longitudinally through a non-rotating spindle and is powered for rotation within said non-rotating spindle, a drive axle cap provided at an axial outer end of said drive axle which rotates with said drive axle and is positioned outside of an outer end of said non-rotating spindle, a wheel hub secured to said drive axle cap and extending axially rearward, and at least one bearing which supports said wheel hub on an exterior of said non-rotating spindle for rotation of said wheel hub around said exterior of said non-rotating spindle, said wheel hub having a lubricating oil within an interior of said wheel hub, the improvement comprising:

a stator biased against said non-rotating spindle and having said drive axle extending therethrough, said stator having an annular outer wall with at least one aperture, an air inlet, and an air passage between the air inlet and the at least one aperture on the annular outer wall;

a housing having an interior annular wall mounted in radially spaced relation with the annular outer wall of the stator to form an annular cavity therebetween, the housing having at least one aperture formed through the interior annular wall, and air outlet, and an air passage between the at least one aperture and air outlet;

the stator and housing having opposed faces spaced along an axial direction and defining an annular cavity therebetween;

a seal inserted within the annular cavity and defining a radial air passage between the apertures defined within the stator annular outer wall and the housing interior annular wall, the housing resting on the seal; and an annular thrust bearing installed between the stator and housing and contacting the opposed faces spaced along the axial direction and configured to allow the housing to rotate with respect to the stator.

2. The powered axle assembly of claim 1, wherein the seal has an H-shaped profile defining an outer annular groove, an inner annular groove, and apertures between the inner and outer annular grooves defining the radial air passage between the stator annular outer wall and the housing interior annular wall, the seal further including a pair of spaced metal annular reinforcing rings installed between the inside annular groove and outside diameter annular groove and on either side of the radial air passage.

3. In a powered axle assembly including a drive axle which extends longitudinally through a non-rotating spindle and is powered for rotation within said non-rotating spindle, a drive axle cap provided at an axial outer end of said drive axle which rotates with said drive axle and is positioned outside of an outer end of said non-rotating spindle, a wheel hub secured to said drive axle cap and extending axially rearward, and at least one bearing which supports said wheel hub on an exterior of said non-rotating spindle for rotation of said wheel hub around said exterior of said non-rotating spindle, said wheel hub having a lubricating oil within an interior of said wheel hub, the improvement comprising:

a stator biased against said non-rotating spindle and having said drive axle extending therethrough, said stator having an annular outer wall with at least one aperture, an air inlet, and an air passage between the air inlet and the at least one aperture on the annular outer wall;

a housing having an interior annular wall mounted in radially spaced relation with the annular outer wall of the stator to form an annular cavity therebetween, the housing having at least one aperture formed through the interior annular wall, and air outlet, and an air passage between the at least one aperture and air outlet;

a wave spring positioned between the housing and an inside surface of the drive axle hub, said wave spring configured to bias the housing away from the drive axle hub and the stator against the non-rotating structure;

a seal inserted within the annular cavity and defining a radial air passage between the apertures defined within the stator annular outer wall and the housing interior annular wall, the housing resting on the seal; and an annular bearing between the stator and housing configured to allow the housing to rotate with respect to the stator.

4. In a powered axle assembly including a drive axle which extends longitudinally through a non-rotating spindle and is powered for rotation within said non-rotating spindle, a drive axle cap provided at an axial outer end of said drive axle which rotates with said drive axle and is positioned outside of an outer end of said non-rotating spindle, a wheel hub secured to said drive axle cap and extending axially rearward, and at least one bearing which supports said wheel hub on an exterior of said non-rotating spindle for rotation of said wheel hub around said exterior of said non-rotating spindle, said wheel hub having a lubricating oil within an interior of said wheel hub, the improvement comprising:

a stator biased against said non-rotating spindle and having said drive axle extending therethrough, said stator having an annular outer wall with at least one aperture, an air inlet, and an air passage between the air inlet and the at least one aperture on the annular outer wall, the stator including a keyway configured to rest within a keyway notch formed on an outside diameter of the spindle so as to rotationally lock the stator with the non-rotating spindle;

a housing having an interior annular wall mounted in radially spaced relation with the annular outer wall of the stator to form an annular cavity therebetween, the housing having at least one aperture formed through the interior annular wall, and air outlet, and an air passage between the at least one aperture and air outlet;

a seal inserted within the annular cavity and defining a radial air passage between the apertures defined within the stator annular outer wall and the housing interior annular wall, the housing resting on the seal; and an annular bearing between the stator and housing configured to allow the housing to rotate with respect to the stator.

5. The powered axle assembly of claim 1, wherein the stator is formed of a hardened metal.

6. The powered axle assembly of claim 4, further including a wave spring positioned between the housing and an inside surface of the drive axle hub, said wave spring configured to bias the housing away from the drive axle hub and the stator against the non-rotating structure.

7. The powered axle assembly of claim 4, wherein the seal has an H-shaped profile defining an outer annular groove, an inner annular groove, and apertures between the inner and outer annular grooves defining the radial air passage between the stator annular outer wall and the housing interior annular wall.

8. The powered axle assembly of claim 7, wherein the seal further includes a pair of spaced metal annular reinforcing rings installed between the inside annular groove and outside diameter annular groove and on either side of the radial air passage.

9. The powered axle assembly of claim 4, the stator and housing having opposed faces spaced along an axial direction and defining an annular cavity therebetween, the annular bearing installed within the annular cavity.

10. The powered axle assembly of claim 9, wherein the annular bearing is a thrust bearing contacting the opposed faces spaced along the axial direction.

11. The powered axle assembly of claim 3, wherein the seal has an H-shaped profile defining an outer annular groove, an inner annular groove, and apertures between the inner and outer annular grooves defining the radial air passage between the stator annular outer wall and the housing interior annular wall.

12. The powered axle assembly of claim 11, wherein the seal further includes a pair of spaced metal annular reinforcing rings installed between the inside annular groove and outside diameter annular groove and on either side of the radial air passage.

13. The powered axle assembly of claim 3, the stator and housing having opposed faces spaced along an axial direction and defining an annular cavity therebetween, the annular bearing installed within the annular cavity.

14. The powered axle assembly of claim 13, wherein the annular bearing is a thrust bearing contacting the opposed faces spaced along the axial direction.

15. The powered axle assembly of claim 1, further including a wave spring positioned between the housing and an inside surface of the drive axle hub, said wave spring configured to bias the housing away from the drive axle hub and the stator against the non-rotating structure.

16. The powered axle assembly of claim 1, wherein the stator further includes a keyway configured to rest within a keyway notch formed on an outside diameter of the spindle so as to rotationally lock the stator with the non-rotating spindle.

17. The powered axle assembly of claim 2, wherein the annular reinforcing rings are configured with a greater width than height.

* * * * *